May 27, 1930.  F. H. DICKSON  1,760,544
WRENCH
Filed Jan. 21, 1930
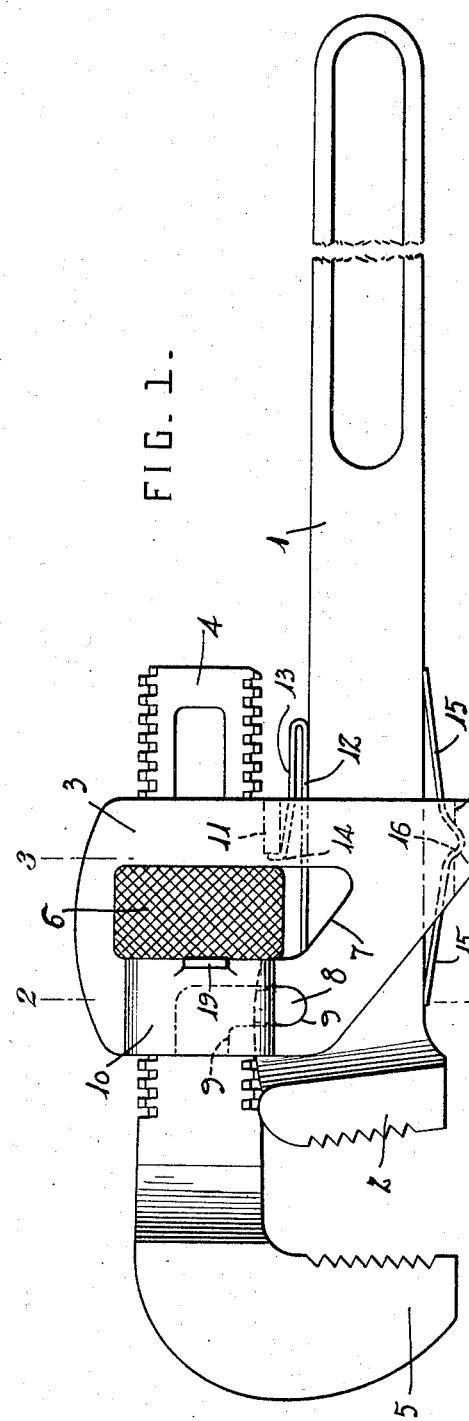
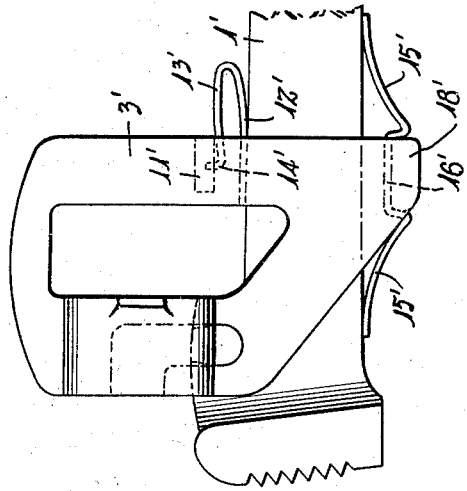
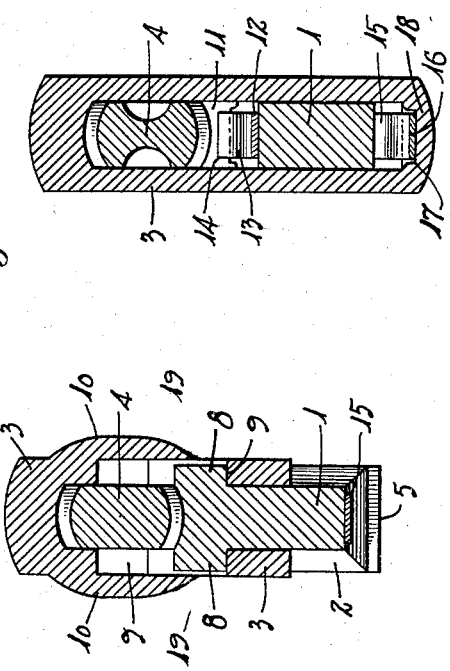
Inventor:
Frank H. Dickson
By Monroe E. Miller
Attorney Patented May 27, 1930

1,760,544

UNITED STATES PATENT OFFICE

FRANK H. DICKSON, OF AUBURN, NEW YORK

WRENCH

Application filed January 21, 1930. Serial No. 422,397.

The present invention relates to wrenches, especially of the Stillson type, and aims to provide a wrench comprising a novel assembly of the component elements whereby the parts of the wrench may be readily assembled and separated.

A further object is to provide a novel detachable pivot joint between the handle shank and frame, which will eliminate the use of a rivet, bolt or similar pivot element, and which will provide a strong connection and one which will permit the frame and shank to be readily separated.

A further object is the provision of springs assembled with the frame and handle shank in a novel manner, not only to permit the springs to be readily removed, but also to avoid rivets, screws or other securing elements for the springs and holes in the shank, which holes in the shanks of Stillson wrenches heretofore in use have resulted in such shanks breaking at the points where the shanks are weakened by the holes, when the shanks are subjected to abnormal bending strain.

With the foregoing and other objects in view, which will be apparent as the description proceeds, the invention resides in the construction and arrangement of parts, as hereinafter described and claimed, it being understood that changes can be made within the scope of what is claimed without departing from the spirit of the invention.

The invention is illustrated in the accompanying drawing, wherein—

Figure 1 is a side elevation of the improved Stillson wrench.

Figs. 2 and 3 are cross sections on the respective lines 2—2 and 3—3 of Fig. 1.

Fig. 4 is a fragmentary side elevation illustrating modifications.

In general respects the wrench is similar to the well-known Stillson type of wrench, and comprises the handle shank 1 having a toothed jaw 2 at its outer end, a frame 3 through which the shank extends, a flat screw stem 4 having a toothed jaw 5 at its outer end complementing the jaw 2, and a nut 6 within an opening 7 of the frame threaded on the stem 4 to adjust the jaw 5 toward and away from the jaw 2 for gripping pipes, rods, and other objects of different diameters.

The handle shank and frame are usually pivoted together to permit of relative swinging motion between the jaws so that they will tightly grip a pipe, rod or other circular object. Rivets are frequently used to provide the pivotal connection, but they are objectionable in making the separation of the frame and shank difficult. In carrying out the present invention the shank 1 is provided immediately in rear of the jaw 2 with outstanding pivot studs 8 at opposite sides, and the frame 3 is provided with bayonet slots 9 in its opposite sides to receive said studs. The bayonet slots open at the forward or outer portion of the frame and their tails extend transversely of the wrench toward the shank 1, the shank 1 and stem 4 extending through the frame for oscillatory motion therein.

When the stem 4 is removed from the frame by unscrewing the nut 6 therefrom, the studs 8 are readily moved into the bayonet slots 9 and seated in the closed ends thereof, thereby providing a pivot connection between the frame and shank. The stem 4 may then be inserted into the frame and the nut 6 within the opening 7 threaded on said stem, thereby preventing the shank and frame from becoming detached accidentally, although they may be readily separated when the shank 4 is detached from the frame. The parts 1, 3, 4 and 6 may thus be readily assembled and separated without permanent connections between them such as rivets, bolts, or the like.

The frame 3 has thickened portions 10 at the opposite sides extending across the open ends of the slots 9 for purpose of strength, and to also provide a seat for the nut 6.

The frame 3 is provided at the rear thereof with a portion 11 connecting the sides of the frame between the shank 1 and stem 4, and this portion is used for the connection of one of the springs. This spring is composed of a flat resilient strip having the portion 12 seating against the shank 1 within the frame, and the spring has the bent back portion or leaf 13 extending across the portion 11 and provided with a hook 14 engaging said portion to retain the spring in place, the opposite end of the spring abutting the portion of the shank 1 which has the studs 8. The terminal 13 of the doubled spring tends to flex away from the shank 1 to apply pressure to the portion 11 of the frame, and by pressing the terminal 13 toward the shank 1 the hook 14 may be disengaged from the portion 11 of the frame, to permit the spring to be slipped out for repair or replacement.

A second spring, also formed from a resilient strip, has the diverging terminals or arms 15 connected by an offset portion 16 which is seated in a notch 17 in the cross portion 18 of the frame 3 at that side of the shank opposite to the stem 4 and spring 12.

The arms 15 of the spring bear against the shank 1 and the intermediate portion of the spring pressing against the portion 18 of the frame tends to swing or move the frame in the corresponding direction. The two springs thus oppose one another and yieldingly maintain the frame and shank in an intermediate position, permitting yielding action in either direction.

By pressing the spring 15, 16 toward the shank it may be disengaged from the notch or seat 17, for removing the spring conveniently.

Neither spring requires holes in or securing elements entering the shank, so that the shank is not weakened, and either spring may be conveniently removed for repair or replacement.

Fig. 4 illustrates a modification in that the spring 12' has the hook 14' of the bent back portion 13' entering a notch in the portion 11' of the frame 3' instead of engaging the end of said portion. The other spring has an oppositely offset portion 16' between the arms 15' which is disposed astride the portion 18' of the frame. Both springs are readily removable.

The present improvements provide a wrench which is stronger and sturdier than wrenches heretofore placed on the market, and also having less parts in its construction and requiring fewer operations in manufacture, although the wrench is highly efficient and effective in the performance of its duties. The parts of the wrench are readily assembled and separated, without the aid of tools, and the handle shank is especially strong so as to withstand excessive strains without breaking. The improvements eliminate all drill press work, there being no holes drilled in any of the parts, and rivets and other securing elements for the springs and pivot are eliminated, not only for purpose of strength, but to also reduce the cost of manufacture.

The thickened portions 10 are preferably provided with outstanding lugs 19 adjacent to and projecting beyond the nut 6, in order that when the wrench is laid on a floor, table or other surface and is kicked about or accidentally moved, the nut 6 will not be turned. Thus, the wrench in being laid on either side will be supported on the corresponding lug 19, which spaces the nut 6 above the floor, table or other surface.

Having thus described the invention, what is claimed as new is:

1. A wrench comprising a frame having bayonet slots, a handle shank extending through the frame and having pivot studs removably seated in said slots, a stem extending through the frame, and a nut on the stem in said frame, the stem and shank having complementing jaws, said slots and stem being so arranged that when the stem is in the frame the studs are prevented from being removed from said slots and when the stem is removed from the frame the studs are movable out of said slots.

2. A wrench comprising a frame, a handle shank extending through the frame and having a jaw at one end and outstanding pivot studs at opposite sides near said jaw, the frame having bayonet slots in which said studs are removably seated, said slots opening at that portion of the frame adjacent to said jaw, a stem extending through the frame and having a jaw complementing the aforesaid jaw, and a nut on the stem in said frame.

In testimony whereof I hereunto affix my signature.

FRANK H. DICKSON.